(12) United States Patent
Madsen et al.

(10) Patent No.: US 7,457,995 B1
(45) Date of Patent: Nov. 25, 2008

(54) METHOD AND APPARATUS FOR GENERATING REFERENCE TRANSMISSION SIGNAL FOR USE IN TESTING COMMUNICATIONS RECEIVERS

(75) Inventors: Benny Madsen, Los Altos, CA (US); Christian Olgaard, Sunnyvale, CA (US); Carsten Andersen, Sunnyvale, CA (US); Gary Wang, Milpitas, CA (US); Thomas Toldborg Andersen, Pleasanton, CA (US); Peter Petersen, Concord, CA (US)

(73) Assignee: LitePoint Corp., Sunnyvale, CA (US)

( * ) Notice: Subject to any disclaimer, the term of this patent is extended or adjusted under 35 U.S.C. 154(b) by 269 days.

(21) Appl. No.: 10/769,971

(22) Filed: Feb. 2, 2004

(51) Int. Cl.
*G01R 31/28* (2006.01)

(52) U.S. Cl. .......................... 714/712; 455/99
(58) Field of Classification Search ................ 714/756, 714/724, 712; 375/224; 455/99; 370/241
See application file for complete search history.

(56) References Cited

U.S. PATENT DOCUMENTS

| | | | | |
|---|---|---|---|---|
| 4,507,740 A | * | 3/1985 | Star et al. | 702/57 |
| 4,541,091 A | * | 9/1985 | Nishida et al. | 714/756 |
| 4,703,433 A | * | 10/1987 | Sharrit | 702/76 |
| 4,704,734 A | * | 11/1987 | Menich et al. | 455/440 |
| 4,819,236 A | * | 4/1989 | Sako et al. | 714/755 |
| 5,428,831 A | * | 6/1995 | Monzello et al. | 455/296 |
| 6,005,894 A | * | 12/1999 | Kumar | 375/270 |
| 6,028,845 A | * | 2/2000 | Serikawa et al. | 370/249 |
| 6,175,939 B1 | * | 1/2001 | Dinteman | 714/724 |
| 6,351,500 B2 | * | 2/2002 | Kumar | 375/270 |
| 6,831,945 B1 | * | 12/2004 | Lovell et al. | 375/222 |

FOREIGN PATENT DOCUMENTS

JP 03291588 A * 12/1991

OTHER PUBLICATIONS

"Parameters tuning of HVDC small signal modulation controllers based on test signal" by Liu et al. Power Engineering Society General Meeting, 2003, IEEE Publication Date: Jul. 13-17, 2003 vol. 4, On p. —2531 vol. 4 ISBN: 0-7803-7989-6 Inspec Accession No. 7979163.*

* cited by examiner

*Primary Examiner*—Cynthia Britt
(74) *Attorney, Agent, or Firm*—Vedder Price P.C.

(57) ABSTRACT

A method and apparatus for generating a reference transmission signal for use in testing a communications system. A data packet transmission signal containing a plurality of reference data is captured and digitized, following which reference data is retrieved. The retrieved data is used to modulate a carrier signal to produce a digital transmission signal, which is stored for later use, such that impairments in a signal from a traditional trusted unit are substantially removed, thereby minimizing uncertainty during later testing using such signal.

11 Claims, 3 Drawing Sheets

METHOD AND APPARATUS FOR GENERATING REFERENCE TRANSMISSION SIGNAL FOR USE IN TESTING COMMUNICATIONS RECEIVERS

BACKGROUND OF THE INVENTION

1. Field of the Invention

The present invention relates to test equipment for communications receivers, and in particular, to methods for generating test signals for complex digital communications systems.

2. Description of the Related Art

Requirements for modern test equipment have become increasingly advanced, since testing generally no longer involve small subsystems, but complete, and increasingly complex, systems. As a result, it is often necessary to generate complex test signals, particularly for digital communications equipment, to sufficiently exercise the functions and capabilities of the device under test (DUT). Many systems, including those implemented in integrated circuits and often referred to as a "system on a chip" (SOC), have many different test modes. Accordingly, implementing all such test modes in hardware in any given piece of test equipment is not practical. Hence, test equipment vendors more often provide software solutions to enable the user of the test equipment to generate customized test signals (often referred to as data packages). These software solutions often require significant knowledge on the part of the users, thereby necessitating significant training and learning for using the software. Furthermore, such software solutions are often very expensive and are usually overkill in the sense that many applications require relatively few and relatively simple tests, such as receiver sensitivity, as opposed to complex testing, such as the effects of specific bit errors.

SUMMARY OF THE INVENTION

In accordance with the presently claimed invention, a data packet transmission signal containing a plurality of reference data is captured and digitized, following which reference data is retrieved. The retrieved data is used to modulate a carrier signal to produce a digital transmission signal, which is stored for later use, such that impairments in a signal from a traditional trusted unit are substantially removed, thereby minimizing uncertainty during later testing using such signal.

In accordance with one embodiment of the presently claimed invention, a method for generating a reference transmission signal for use in testing a communications receiver includes:

capturing a data packet transmission signal containing a plurality of reference data;

digitizing the data packet transmission signal;

retrieving at least a selected portion of the plurality of reference data from the digitized data packet transmission signal to produce a plurality of retrieved data;

modulating a carrier signal with the plurality of retrieved data to produce a digital transmission signal; and storing the digital transmission signal.

In accordance with another embodiment of the presently claimed invention, circuitry for generating a reference transmission signal for use in testing a communications receiver includes:

signal capture means for capturing a data packet transmission signal containing a plurality of reference data;

digitizer means for digitizing the data packet transmission signal;

first data retrieval means for retrieving at least a selected portion of the plurality of reference data from the digitized data packet transmission signal to produce a plurality of retrieved data;

signal modulator means for modulating a carrier signal with the plurality of retrieved data to produce a digital transmission signal; and storage means for storing the digital transmission signal.

DETAILED DESCRIPTION OF THE INVENTION

Figure 1:
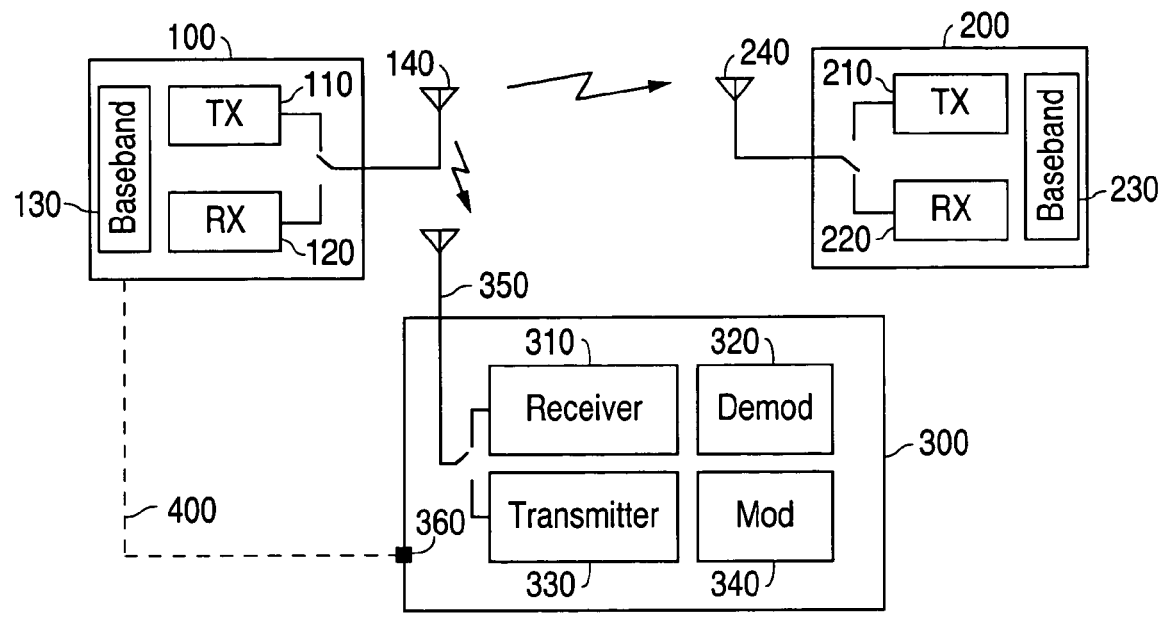
FIG. 1 illustrates a technique for capturing a wireless data signal indirectly for use in generating a reference transmission signal in accordance with one embodiment of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

In accordance with the presently claimed invention, a method and apparatus for generating a desired test signal is provided. As modern test equipment begins to integrate both transmitter and receiver within a single housing (e.g., see commonly assigned, co-pending U.S. patent application Ser. No. 10/770,020, filed on even date herewith and entitled, "Integrated Radio Frequency (RF) Tester", the disclosure of which is incorporated herein by reference), it is possible to use the internal receiver to capture an actual signal from an existing known good sample of a DUT ("trusted unit"). Such signal captured by the receiver can then be demodulated or decoded using the software within the tester, since the software must be able to process its received signals in order to analyze them. As long as this capture is done at moderate or strong receive signal levels, few if any bit errors should be expected due to noise or signal attenuation. Accordingly, the data bits are known, so a valid decoded data stream now exists within the tester. The transmitter software can then use the received bit pattern to generate an ideal representation of the received data stream. Since the transmitter within the tester will be of high quality, a high quality transmit signal can be produced, thereby ensuring minimal bit errors.

As a result, it is possible to create a replacement for a trusted unit often used in production test equipment by simply capturing the transmission signal of the trusted unit and having the test equipment recreate the bit patterns. This will allow necessary and appropriate test signals to be quickly created and consistently generated for use in a production environment as well as in a testing and debugging operation.

As discussed in more detail below, in accordance with the presently claimed invention, the desired signal is captured, following which the subject data is retrieved and any imperfections removed. The resulting desired data is then remodulated to produce a digital signal representing the desired reference, or test, signal. Such signal can then be stored for later and multiple uses.

Referring to FIG. 1, one way to capture a known good signal is to indirectly receive (often referred to as "sniffing") the actual signal sent by a trusted unit 100 to a DUT 200. The trusted unit 100 has a baseband section 130 which provides the baseband data for the transmitter portion 110 as well as processes the baseband data received via the receiver portion 120. The DUT 200 includes similar baseband 230, transmitter 210 and receiver 220 portions. A transmitted signal emanating from the antenna 140 of the trusted unit 100 is received by the antenna 240 of the DUT 200, as well as the antenna 350 of the tester 300.

The received data signal is processed within a receiver 310 in the tester 300, and further processed by a demodulator section (e.g., digital signal processor) 320. As an integrated tester, the tester 300 also includes a modulator (e.g., digital signal processor) 340 and a transmitter 330 for generating test signals. A timing signal 400 from the baseband section 130 of the trusted unit 100 can also be provided for use in determining any necessary timing information between data packets contained within the received data signal. Such timing signal 400 also helps to identify the data signal received at the antenna 350 of the tester 300 as being that emanating from the trusted unit 100 as opposed to a data signal originating from the DUT 200.

Figure 2:
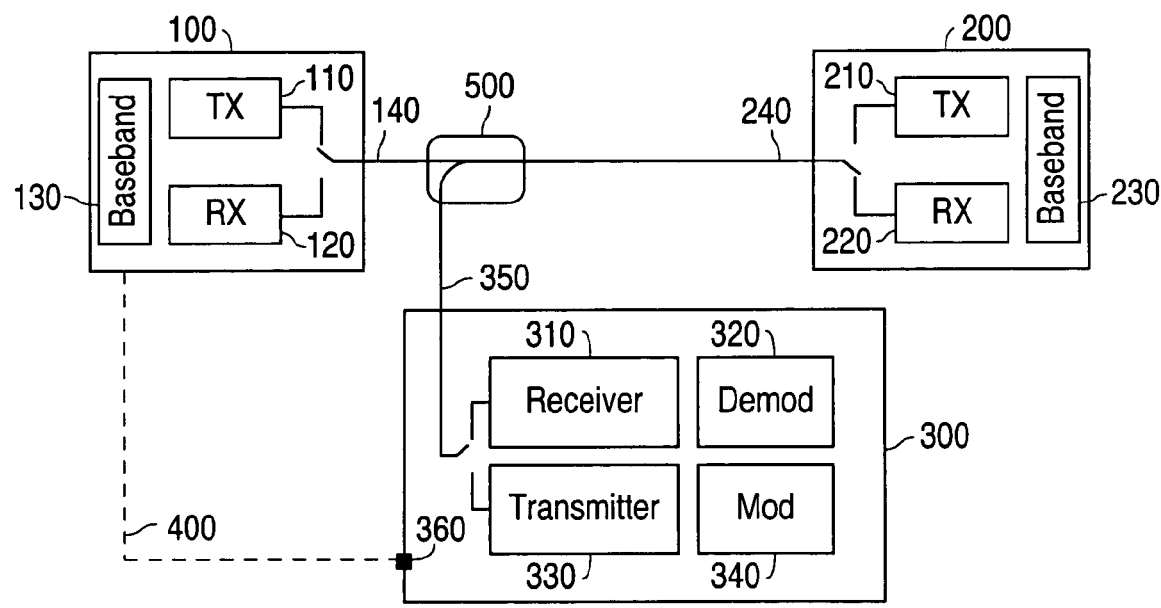
FIG. 2 illustrates another technique for capturing a data signal indirectly for use in generating a reference transmission signal in accordance with another embodiment of the presently claimed invention.

Referring to FIG. 2, an alternative technique for indirectly receiving the data signal from the trusted unit 100 involves the use of a power splitter or directional coupler 500 which will generally provide a more reliable signal path for conveying the desired signal from the trusted unit 100 to the tester 300.

Figure 3:
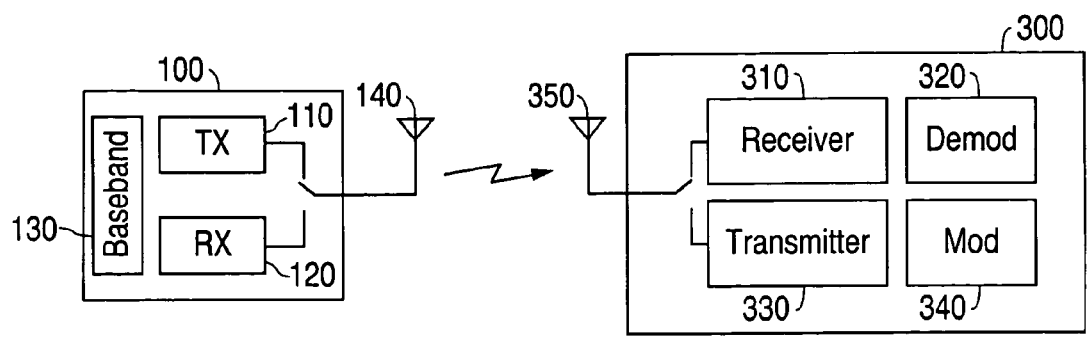
FIG. 3 illustrates a technique for capturing a wireless data signal more directly for use in generating a reference transmission signal in accordance with another embodiment of the presently claimed invention.

Referring to FIG. 3, another alternative technique is the direct reception of the data signal by the tester 300. This technique is similar to that depicted in FIG. 1. However, without a DUT 200 involved, it is possible that the tester 300 can be placed in closer proximity or more direct line of sight alignment with the signal coming from the trusted unit 100.

Figure 4:
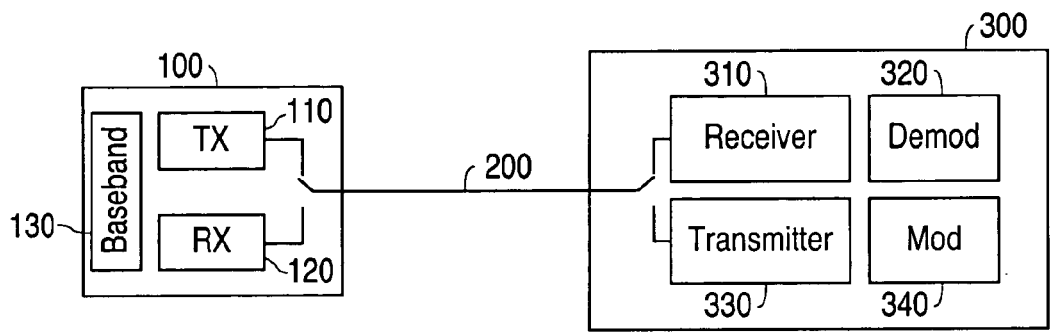
FIG. 4 illustrates a technique for capturing a wired data signal directly for use in generating a reference transmission signal in accordance with another embodiment of the presently claimed invention.

Referring to FIG. 4, perhaps a more reliable technique is a direct wired connection 200 between the trusted unit 100 and the tester 300.

Figure 5:
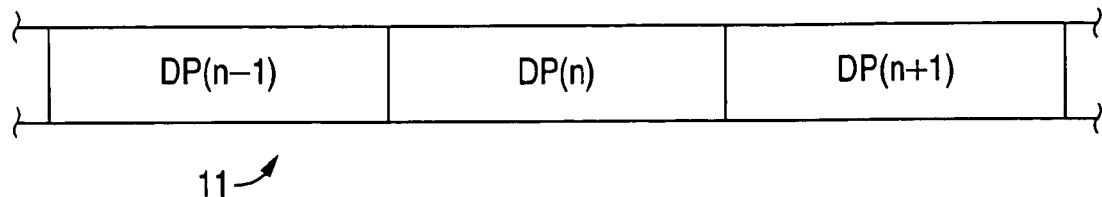
FIG. 5 depicts a data signal having multiple data packets.

Referring to FIG. 5, the data signal 11 transmitted by the trusted unit 100 will often include multiple data packets DP, among which one data packet DP(n) may be the data packet of interest, as opposed to other data packets DP(n−1), DP(n+1). Accordingly, as mentioned above, it may be desirable, and sometimes necessary to also receive some form of timing information along with the data signal 11 so as to ensure that the desired data packet DP(n) is selected and processed.

Since the signal 11 has been received from a known good unit, i.e., the trusted unit, the data packets contained therein are known to be valid and could possibly be used for communication with a DUT directly. However, the received signal may still have some impairments, which may affect the receiver of the DUT, thereby resulting in an excessive bit error rate (BER). Further, the power level and format of the received signal may not be directly compatible with the transmitter section of the tester, thereby causing some uncertainty about the signal being transmitted by the tester. For example, normally the signal must be scaled to a certain level so as to enable calibration within the tester, so significant post processing may be required to use the captured signal directly. Moreover, the captured signal may not be in the proper format, e.g., the receiver may use a sampled IF (intermediate frequency) receiver to capture the signal, while the transmitter of the tester uses a quadrature frequency up-conversion process. Accordingly, rather than using the captured signal directly, the signal is processed so as to retrieve the actual data contained within the data packet DP, i.e., in its pure digital (binary) form.

Figure 6:
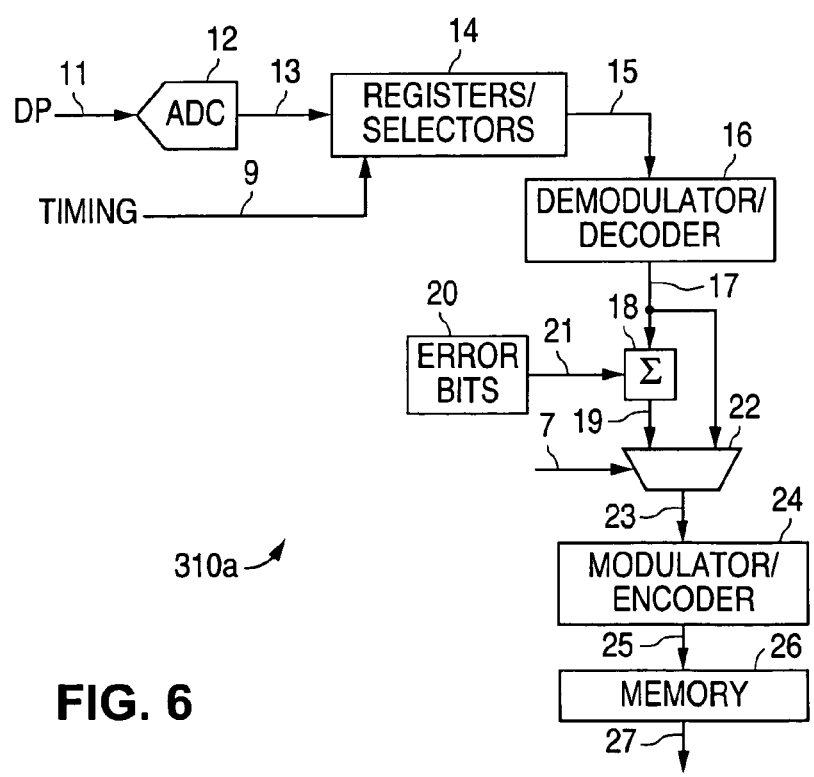
FIG. 6 depicts a system for generating a reference transmission signal in accordance with one embodiment of the presently claimed invention.

Referring to FIG. 6, that portion 310a of the receiver responsible for capturing and processing the data packet signal 11 digitizes the data packet signal 11 with a digitizer 12 (e.g., analog-to-digital converter). The digitized signal 13 is then placed in some form of registers or data selectors 14 from which the desired data packet 15 is selected, e.g., in accordance with timing information 9 as noted above.

The desired data packet 15 is processed in a demodulator or decoder 16 so as to produce the actual data contained within the data packet 11. (Such demodulation or decoding removes any modulation or encoding, such as frequency shift keying, phase shift keying, pulse width modulation, Manchester encoding, return-to-zero encoding, non-return-to-zero encoding, among others well known in the art.) This binary data 17 is passed on to a data combiner 18 and a data selector 22 (e.g., a multiplexor). In the data combiner 18, the binary data 17 can be selectively altered with one or more bits 21 from a selection of error bits 20, thereby producing a binary signal 19 having one or more selected bits altered so as to selectively introduce bit errors as desired. In accordance with a data selection signal 7, the actual binary data 17 or altered data 19 is provided as the selected data signal 23 to a modulator or encoder 24 which provides an appropriately modulated or encoded signal 25 representing the selected data signal 23 with no signal impairments. This data signal 25 can then be stored, e.g., in a memory 26, for later and multiple uses in testing DUTs. Hence, an ideal data signal becomes consistently available for later use(s) in testing multiple systems.

By retrieving and processing the received data packet signal 11 in this manner, since such retrieval and processing is offline, i.e., not done in real time during an actual test, any necessary processing on the part of the demodulator/decoder 16 and modulator/encoder 24 can be performed regardless of any complexities, thereby ensuring the creation of a good reference data signal for later use in tests.

Figure 7:
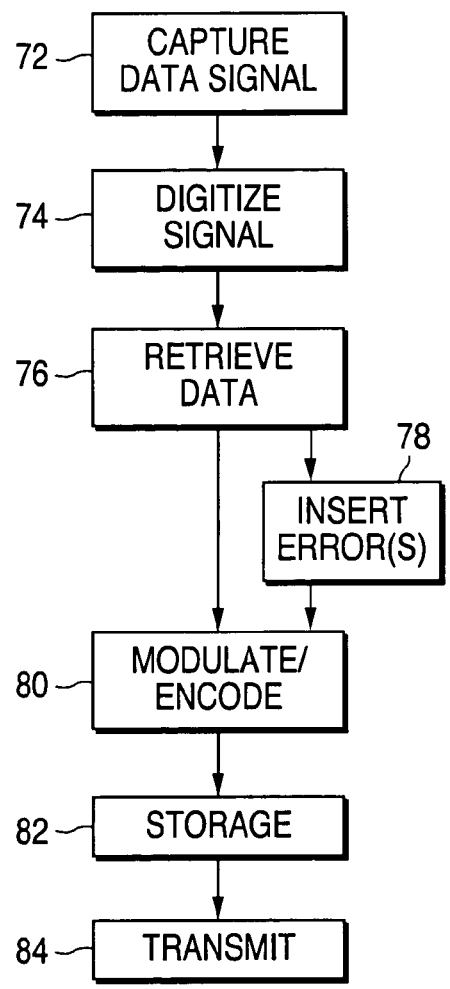
FIG. 7 depicts a method for generating a reference transmission signal in accordance with another embodiment of the presently claimed invention.

Referring to FIG. 7, a methodology for generating a reference transmission signal for use in testing a communications receiver in accordance with the presently claimed invention can be described as follows. In conformance with the discussion above, the first phase of operation 72 includes the capturing of the data signal. Following that, the next operational phase 74 is the digitizing of the captured signal, followed by a phase 76 in which the actual data is retrieved (e.g., demodulated or decoded).

Following that, the next phase of operation 80 is the modulation or encoding of the retrieved data, or alternatively, an intermediate phase 78 in which one or more bit errors are introduced by the substitution of selected bits in the data stream, followed by the modulation or encoding phase 80. The next operational phase 82 is the storage of the modulated or encoded data signal for later and multiple uses in tests. Lastly, for each of such tests, the stored data signal is retrieved and transmitted in a signal transmission operation 84 for the actual tests.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for generating a reference transmission signal for use in testing a communications system, comprising:
    capturing a data packet transmission signal containing a plurality of reference data;
    digitizing said data packet transmission signal;
    retrieving at least a selected portion of said plurality of reference data from said digitized data packet transmission signal to produce a plurality of retrieved data;
    modulating a carrier signal with said plurality of retrieved data to produce a digital transmission signal;
    storing said digital transmission signal following said modulating of said carrier signal and prior to a use of said digital transmission signal in producing said reference transmission signal for transmission and demodulation;
    retrieving said stored digital transmission signal; and
    quadrature frequency up-converting said retrieved digital transmission signal to produce said reference transmission signal.

2. The method of claim 1, wherein said capturing a data packet transmission signal containing a plurality of reference data comprises receiving said data packet transmission signal as an analog signal.

3. The method of claim 1, wherein said capturing a data packet transmission signal containing a plurality of reference data comprises receiving said data packet transmission signal as a wireless signal.

4. The method of claim 1, wherein said capturing a data packet transmission signal containing a plurality of reference data comprises receiving said data packet transmission signal as a wired signal.

5. The method of claim 1, wherein said retrieving at least a selected portion of said plurality of reference data from said digitized data packet transmission signal to produce a plurality of retrieved data comprises demodulating at least a selected portion of said digitized data packet transmission signal to produce a plurality of demodulated data.

6. The method of claim 1, wherein said retrieving at least a selected portion of said plurality of reference data from said digitized data packet transmission signal to produce a plurality of retrieved data comprises decoding at least a selected portion of said digitized data packet transmission signal to produce a plurality of decoded data.

7. The method of claim 1, wherein said modulating a carrier signal with said plurality of retrieved data to produce a digital transmission signal comprises encoding said carrier signal with said plurality of retrieved data.

8. The method of claim 1, wherein said storing said digital transmission signal comprises storing said digital transmission signal in memory.

9. The method of claim 1, further comprising modifying one or more selected bits of said plurality of retrieved data prior to said modulating a carrier signal with said plurality of retrieved data to produce said digital transmission signal.

10. An apparatus including circuitry for generating a reference transmission signal for use in testing a communications system, comprising:
    signal capture means for capturing a data packet transmission signal containing a plurality of reference data;
    digitizer means for digitizing said data packet transmission signal;
    first data retrieval means for retrieving at least a selected portion of said plurality of reference data from said digitized data packet transmission signal to produce a plurality of retrieved data;
    signal modulator means for modulating a carrier signal with said plurality of retrieved data to produce a digital transmission signal;
    storage means for storing said digital transmission signal following said modulating of said carrier signal and prior to a use of said digital transmission signal in producing said reference transmission signal for transmission and demodulation;
    second data retrieval means for retrieving said stored digital transmission signal; and
    frequency conversion means for quadrature frequency up-converting said retrieved digital transmission signal to produce said reference transmission signal.

11. The apparatus of claim 10, further comprising data modifier means for modifying one or more selected bits of said plurality of retrieved data prior to said modulation of a carrier signal with said plurality of retrieved data to produce a digital transmission signal.

* * * * *